US012812297B2

(12) United States Patent
Singleton et al.

(10) Patent No.: US 12,812,297 B2
(45) Date of Patent: Nov. 24, 2026

(54) METHOD AND SYSTEM FOR DIRECTIONAL PROCESSING OF AUDIO INFORMATION

(71) Applicant: THE SECRETARY OF STATE FOR DEFENCE, Salisbury (GB)

(72) Inventors: Gregory Singleton, Salisbury (GB); Phillip Henry Glasson, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 307 days.

(21) Appl. No.: 18/556,982

(22) PCT Filed: Apr. 20, 2022

(86) PCT No.: PCT/IB2022/053711
§ 371 (c)(1),
(2) Date: Oct. 24, 2023

(87) PCT Pub. No.: WO2022/229797
PCT Pub. Date: Nov. 3, 2022

(65) Prior Publication Data
US 2024/0373161 A1 Nov. 7, 2024

(30) Foreign Application Priority Data
Apr. 29, 2021 (GB) ..................................... 2106094

(51) Int. Cl.
*H04R 3/00* (2006.01)
*H04R 1/40* (2006.01)
*H04R 3/12* (2006.01)

(52) U.S. Cl.
CPC ............. *H04R 3/005* (2013.01); *H04R 1/403* (2013.01); *H04R 1/406* (2013.01); *H04R 3/12* (2013.01); *H04R 2201/401* (2013.01)

(58) Field of Classification Search
CPC ......... H04R 3/005; H04R 1/403; H04R 1/406
See application file for complete search history.

(56) References Cited

U.S. PATENT DOCUMENTS 5,473,701 A * 12/1995 Cezanne ................ H04R 1/406 381/92
7,330,557 B2 * 2/2008 Fischer ................ H04R 25/407 381/313

(Continued)

FOREIGN PATENT DOCUMENTS

| | | |
|---|---|---|
| EP | 1278395 A2 | 1/2003 |
| EP | 1916872 A2 | 4/2008 |
| GB | 2414800 A | 7/2005 |

OTHER PUBLICATIONS

United Kingdom Patent Application No. GB2106094.2, Search Report dated Jul. 20, 2021, 3 pages.

(Continued)

*Primary Examiner* — Disler Paul
(74) *Attorney, Agent, or Firm* — Kilpatrick Townsend & Stockton LLP

(57) ABSTRACT

A method and system is provided for processing audio information in a digital signal processor, where the audio information is either received from a microphone array or applied to a loudspeaker array. The digital signal processor applies a double delay-and-subtract beamforming algorithm to two non-collinear pairs of microphone outputs or loudspeaker inputs to provide an array with improved directionality and more uniform signal rejection away from the main beam of the beam formed signal. This can be further improved by tessellating multiple arrays into a macro-array and superimposing their responses.

16 Claims, 7 Drawing Sheets

(56) References Cited

U.S. PATENT DOCUMENTS

| | | | | |
|---|---|---|---|---|
| 9,226,070 | B2 * | 12/2015 | Hyun | H04R 3/005 |
| 9,749,745 | B2 * | 8/2017 | Chen | H04R 1/406 |
| 9,913,030 | B2 * | 3/2018 | Bernardini | H04R 1/406 |
| 9,940,949 | B1 | 4/2018 | Vitaladevuni et al. | |
| 10,356,514 | B2 * | 7/2019 | Elko | H04R 1/406 |
| 10,659,873 | B2 * | 5/2020 | Elko | H04R 3/005 |
| 10,873,805 | B2 * | 12/2020 | Chang | H04R 3/005 |
| 2001/0028718 | A1 | 10/2001 | Hou | |
| 2004/0175005 | A1 * | 9/2004 | Roeck | H04R 25/552<br>381/74 |
| 2013/0010982 | A1 | 1/2013 | Elko et al. | |
| 2015/0016628 | A1 | 1/2015 | Li | |
| 2018/0376239 | A1 | 12/2018 | Hayashida et al. | |

OTHER PUBLICATIONS

International Patent Application No. PCT/IB2022/053711, International Search Report and Written Opinion mailed Jul. 19, 2022, 18 pages.

International Patent Application No. PCT/IB2022/053711, International Preliminary Report on Patentability mailed Nov. 9, 2023, 12 pages.

* cited by examiner

METHOD AND SYSTEM FOR DIRECTIONAL PROCESSING OF AUDIO INFORMATION

This application relates to a method and apparatus for directional processing of audio information in a digital signal processor for a microphone array or a loudspeaker array. In particular, the application is directed to a method and apparatus for processing audio signals involved in audio beamforming.

Audio beamforming can be applied to a set of microphones, whereby the outputs of the set of microphones are combined in order to amplify sounds from a given direction relative to sounds from all other directions, which are attenuated by comparison. When instead applied to loudspeakers, audio beamforming drives a set of loudspeakers in order to provide a highly directional sound output. Each set may be referred to as an array.

These directional microphone arrays may be used as a solution to the "cocktail party effect", in which it can be difficult for a person to focus on a particular audio source, such as a single talker or conversation, in a noisy environment, and even more difficult to discern if the sound is first recorded at a microphone, before being played back, for example though a hearing aid or the subsequent playing of a recording. This is in part because the human brain's neurological processing of the live environment and associated audio filtering is lost and thus the intelligibility of the speech or other sound source can be severely reduced.

This problem manifests itself in many areas of modern life where a single speaker or sound source needs to be distinguishable from the surrounding noise, e.g. for personal hearing aids or detecting the position of an object known to be associated with a particular sound signature, such as an animal, a vehicle, a drone or other aircraft, or alternatively for detecting the direction of signs of life in an emergency rescue situation.

While known directional microphone arrays can exhibit good directionality in particular frequency bands, maintaining this directionality at lower frequencies using known methods requires microphone arrays having increasingly larger dimensions. For example, some arrays have been proposed that are around 2 metres in diameter. Accordingly, there is an undesirable trade-off in the prior art over the size of the microphone array or its uniformity of response and directionality over a wideband of audio frequencies.

One known example of a beamforming algorithm is the delay-and-sum algorithm, in which a delay is added to one or more audio signals (received from each microphone, or applied to each loudspeaker) so that signals in the intended beamforming direction are all synchronised and constructively add together. Conversely, signals in other directions are not synchronised and tend to cancel each other out by adding together destructively. While this may lead to the desired narrow beam at high frequencies, the beam at low frequencies is typically very broad by comparison. This means that the array is typically equally sensitive in all directions (omnidirectional) at these lower frequencies.

In order to overcome the drawbacks at lower frequency ranges, prior art methods for delay-and-sum beamforming algorithms use ever larger arrays of microphones/loudspeakers. Increasing the physical size of the array is also desirable for reducing the number of, or impact of, grating lobes that correspond to angles outside of the intended beam where the array is highly sensitive for particular frequency ranges. However, this increased physical size of the array is of course undesirable for the manufacture, portability and practicality of such techniques.

Another example of a beamforming algorithm is the delay-and-subtract algorithm, in which a delay is added to one microphone of a pair of microphones and then the audio signals are subtracted. If the source of the sound is in a direction that is orthogonal to the axis running through the pair of microphones then the sound will reach both of the microphones at the same time. If a delay was not added to one of the audio signals prior to subtraction then the audio signal of the source at each of the microphones would cancel out. This direction from which audio signals are not detected (because they are cancelled out) will be referred to as a null and the response or sensitivity of the microphone pair in this direction will be zero. There will also be a second null on the opposing side of the axis.

By adding a delay to one of the audio signals prior to subtraction, these null directions are offset from being orthogonal to the axis running through the pair of microphones. Referring to FIG. 1, the solid arrow corresponds to the incoming direction of a sound wave approaching a pair of microphones, A and B, that are a distance d apart from each other, and the angle θ corresponds to the angle of approach of the sound wave compared to the axis running through the pair of microphones. As illustrated in FIG. 1, the following calculations are on the basis of the sound source being sufficiently far away that the sound wave front approximates a flat wave front. In this case, the audio signal will arrive at microphone A at a time t and then subsequently arrive at microphone B at a time (t+T) and the null difference equation will be:

$$A(t) - B(t+T) = 0 \tag{1}$$

where T is given by:

$$T = \frac{d\cos\theta}{c} \tag{2}$$

and c is the speed of sound, alternatively it may be expressed as:

$$B(t) - A(t-T) = 0 \tag{3}$$

In two dimensions, there will be two null directions both at an angle θ to the axis, and in three dimensions this would form a null cone having a cone aperture/apex angle of 2θ, as illustrated in FIG. 2. Audio signals coming from directions that are away from these nulls will not be cancelled out; however the nature of this arrangement will result in a low sensitivity for low frequencies where the wavelength of the signal is very much larger than the distance between the microphones in the pair. To combat this, it is common to apply a filter to the output of such a delay-and-subtract pair to increase the gain of the lower frequency bands in order to obtain a flat frequency response for audio signals originating from the beamforming direction. This will however also boost the noise floor in these frequency bands and so a balance needs to be struck in setting this white noise gain appropriately. This filter may be referred to as a frequency equalisation filter or a normalisation filter.

For a delay-and-subtract pair with a time delay set to give nulls at approximately ±110°, an example normalised (filtered with a frequency equalisation filter as above) response may be as shown in FIG. 3 where the x axis shows the azimuth angle in degrees from the intended beamforming direction, the y axis is a logarithmic scale of frequency in kHz, and the lighter regions correspond to higher dB sensitivity at that frequency and angle. The audio signal $B_{diff}(t)$ of this pair of microphones can be rewritten as:

$$B_{diff}(t) = B(t) - A(t - T_1) \tag{4}$$

$B_{diff}(t)$ will be zero (i.e. a null) when equation 2 holds true. This pair may be considered to be a multi-sensor microphone and used as one of a further pair of microphones arranged in a linear array and to be input into a delay-and-subtract beamforming algorithm. In particular, a pair of microphones A and B may undergo delay-and-subtract beamforming to generate the audio signal associated with the pair AB, another pair of microphones C and D (that is collinear with the AB pair) may undergo delay-and-subtract beamforming to generate the audio signal associated with the pair CD, and then the AB audio signal and the CD audio signal may undergo delay-and subtract beamforming. This may be referred to as a collinear double delay-and-subtract beamforming array.

If the distance between the CD pair of microphones is set to be equal to the distance between the AB pair of microphones, then the audio signal $D_{diff}(t)$ of the CD pair of microphones can be rewritten as:

$$D_{diff}(t) = D(t) - C(t - T_1) \tag{5}$$

Treating $B_{diff}$ and $D_{diff}$ mathematically as a new pair of microphones for the double delay-and-subtract then gives:

$$D_{double\text{-}dif}(t) = D_{diff}(t) - B_{diff}(t - T_2) \tag{6}$$

$$D_{double\text{-}diff}(t) = D(t) - C(t - T_1) - B(t - T_2) + A(t - T_1 - T_2) \tag{7}$$

where $T_1$ corresponds to the time difference for the arrival of the audio signal between A and B, and also between C and D, and $T_2$ corresponds to the time difference for the arrival of the audio signal between the AB pair and the CD pair, based on the distance between microphone B and microphone D.

This can be pictorially represented as shown in FIG. 4, where there are now two null cones. The $\theta_1$ null cone corresponds to the $B_{diff}$ and $D_{diff}$ audio signals and can be steered, for a given spacing between the microphones in each of the AB and CD pairs, by adjusting the time delay $T_1$. The $\theta_2$ null cone corresponds to the $D_{double\text{-}diff}$ audio signal and can be steered, for a given spacing between the AB and CD pairs, by adjusting the time delay $T_2$.

The impact on the directional frequency response of the linear microphone array of the double delay-and-subtract method to produce two null cones can be seen in FIG. 5, in which null cones are now provided at ±90° and ±150°. The additional null provides a broader audio signal rejection at angles away from the beamforming angle; however, there is still a significant amount of sensitivity between these two null cones, particularly at higher frequencies where these techniques are found to perform worse than the delay-and-sum beamforming algorithms.

One option to provide greater control of the steering of the sensitivity of a microphone array is to use two zero-delay subtracted microphone pairs that are oriented orthogonally, rather than two linearly oriented pairs using double delay-and-subtract. Where the separation between the microphones in each pair is much smaller than the wavelengths of the sounds of interest, the output of a zero-delay subtracted pair approximates the spatial derivative of sound pressure $\partial p/\partial x$, where x is distance along the axis of the pair and p is the sound pressure. The pair may be referred to as a dipole and closely-separated dipoles using subtraction are sometimes called a differential pair.

Two mutually orthogonal differential pairs can be used to estimate the gradient vector $$\nabla p = \left(\frac{\partial p}{\partial x}, \frac{\partial p}{\partial y}\right),$$

and from this the directional derivative $u \cdot \nabla p$ in any direction u can be estimated by a linear weighted addition of the two array outputs. This allows the beamforming angle to be electronically steered in any direction within a plane (or three-dimensional space by using more mutually orthogonal differential pairs) using the corresponding orthogonal nulls; however, combining the respective audio signals in this manner causes the nulls to be modified. Since the constituent nulls are not present in the combined steered audio signal, it becomes very difficult to design a microphone array having a desired set of characteristics for the steered audio signal. Accordingly, such techniques typically do not perform well at high frequencies and are not easily scalable. Instead, these techniques are computationally expensive and hard to implement in standalone hardware.

Therefore, the inventors have appreciated that it would be desirable to provide a method and system for directional processing of audio information of a microphone array that is simple to design and implement and computationally efficient while providing improved white noise gain. In particular, a small system that has a good low-frequency performance, that is scalable to systems that can also provide good high-frequency performance, and is very computationally inexpensive so that it can be readily implemented.

SUMMARY OF THE INVENTION

The invention is defined in the independent claims to which reference should now be directed. Advantageous features are set out in the dependent claims.

In a first aspect of the present disclosure, a method for directional processing of audio information in a digital signal processor for a microphone array is provided. The method comprising: receiving an audio signal from each microphone of a microphone array, wherein the microphone array comprises at least two parallel pairs of microphones that are non-collinear with respect to each other, wherein a first pair of microphones comprises a first microphone and a second microphone and a second pair of microphones comprises a third microphone and a fourth microphone, and wherein each microphone is arranged on a plane.

The method further comprises applying a first time delay to the audio signal from the second microphone, and subtracting the delayed audio signal of the second microphone from the audio signal from the first microphone to determine an audio signal associated with the first pair of microphones; applying a second time delay to the audio signal from the fourth microphone, and subtracting the delayed audio signal of the fourth microphone from the audio signal from the third microphone to determine an audio signal associated with the second pair of microphones; and applying a third time delay to the audio signal associated with the second pair of microphones, and subtracting the delayed audio signal associated with the second pair of microphones from the audio signal associated with the first pair of microphones to determine an audio signal associated with the microphone array; wherein the first, second and third time delays are configured to control the directionality of the audio signal associated with the microphone array.

In this manner, the method advantageously provides a directional frequency response that has wideband suppression away from the direction of interest for isolation/localisation of a sound source in the plane of the microphone array.

Optionally, the first time delay may be set based on the relative distance between the first and second microphones, the second time delay may be set based on the relative distance between the third and fourth microphones, and third time delay may be set based on the relative distance between the first pair of microphones and the second pair of microphones.

Optionally, the distance between the microphones in a pair of microphones may be uniform across the pairs of microphones, this results in the first time delay and the second time delay also being equal to each other. By matching the pairs of microphones in this manner, the combined output of the respective pairs will have the same characteristics, which simplifies the associated processing of the respective outputs. Optionally, the microphone array may conform to the specific embodiment of two pairs of microphones where the four microphones are positioned at the vertices of a parallelogram.

Optionally, a frequency equalisation filter may be applied to the audio signal associated with the microphone array. This frequency equalisation filter can be tuned to compensate for attenuations in the frequency response of the algorithmically processed output of the array so as to provide a flat frequency response that is normalised across the operating range of frequencies. These attenuations can be as a result of imperfections in the frequency response of the physical microphones that make up the array and/or as a result of the delay-and-subtract processing itself. In practice, lower frequencies will typically be attenuated by the delay-and-subtract algorithm processing much more than higher frequencies and so the frequency equalisation filter will typically be tuned to boost the gain of these lower frequencies so that the output more accurately reflects the real world sound being observed.

Optionally, each of the microphones in the array may be chosen to have an omnidirectional polar pattern. This advantageously simplifies the visualisation processing/simulation of the array response during the design phase of creating a given system. Furthermore, selecting the microphones in the array to have the same response as each other simplifies the processing of the audio signals detected by the respective physical microphones as it is not necessary to account for the different polar response patterns, for example by introducing a weighting to the audio signal associated with one of the microphones during the subtraction calculation.

Optionally, the determined audio signal associated with the microphone array may correspond to a given direction based on the value of the first, second and third time delays; and the method may further comprise iteratively adjusting the first, second and third time delays and determining a plurality of corresponding audio signals associated with the iteratively adjusted first, second and third time delays. By comparing the plurality of corresponding audio signals, the direction most closely corresponding to a desired sound signature or source may be determined. This advantageously provides a sweeping adjustment of the directionality of the microphone array for use in localising the direction of arrival of a sound signature that is being observed or desired to be observed.

Optionally, the method may further comprise determining one or more respective audio signals associated with one or more corresponding further microphone arrays arranged on the plane, and combining each audio signal associated with the microphone arrays to determine an audio signal associated with an array of the microphone arrays using a beamforming algorithm. Combining an array of these microphone arrays into a larger macro-array provides an improved performance in comparison to a single microphone array. In particular, the directionality of the macro-array may optimised by combining the null directions of each constituent microphone array to build up overlapping nulls in the directions away from the beamforming direction or direction of interest/maximum sensitivity. Advantageously, the nulls of the respective microphone arrays may be targeted to overlap with weak points in the existing macro-array or vice versa.

Optionally, the beamforming algorithm may be selected to be a delay and sum beamforming algorithm. This advantageously mixes the benefits of the delay-and-sum algorithm and the delay-and-subtract algorithm. For example, the delay-and-subtraction used within the microphone arrays can be optimised to provide wideband signal rejection at directions away from the beamforming direction, even at the lower frequencies, and the delay-and-sum of the respective microphone arrays can be optimised to narrow the width of the main beam at the beamforming direction, even at the higher frequencies.

Optionally, the plurality of microphone arrays may be tessellated together such that at least one microphone is shared between two adjacent microphone arrays. This advantageously reduces the total number of physical microphones that is required to form the macro-array since the output of a single physical microphone can be used as an input to the delay-and-subtract algorithm of multiple adjacent microphone arrays.

In a second aspect of the present disclosure, an apparatus for directional processing of audio information for a microphone array is provided. The apparatus comprises one or more inputs that are configured to receive an audio signal from each microphone of a microphone array, wherein the microphone array comprises at least two parallel pairs of microphones that are non-collinear with respect to each other. A first pair of microphones comprises a first microphone and a second microphone and a second pair of microphones comprises third microphone and a fourth microphone, wherein each microphone is arranged on a plane. The apparatus further comprises a digital signal processor that is configured to apply a first time delay to the audio signal from the second microphone, and to subtract the delayed audio signal of the second microphone from the audio signal from the first microphone to determine an audio signal associated with the first pair of microphones; and configured to apply a second time delay to the audio signal from the fourth microphone, and to subtract the delayed audio signal of the fourth microphone from the audio signal from the third microphone to determine an audio signal associated with the second pair of microphones. The digital signal processor is further configured to apply a third time delay to the audio signal associated with the second pair of microphones, and to subtract the delayed audio signal associated with the second pair of microphones from the audio signal associated with the first pair of microphones to determine an audio signal associated with the microphone array. In this regard, the first, second and third time delays are configured to control the directionality of the audio signal associated with the microphone array.

Optionally, the first time delay is set based on the relative distance between the first and second microphones, the second time delay is set based on the relative distance between the third and fourth microphones, and third time delay is set based on the relative distance between the first pair of microphones and the second pair of microphones.

Optionally, the distance between the microphones in a pair of microphones is uniform across the pairs of microphones, and accordingly the first time delay and the second time delay are set to be equal to each other.

Optionally, the microphone array comprises two pairs of microphones and the first, second, third and fourth microphones are arranged at the vertices of a parallelogram. Optionally, the digital signal processor is further configured to apply a frequency equalisation filter to the audio signal associated with the microphone array. Optionally, the received audio signals correspond to microphones of the microphone array having an omnidirectional polar pattern.

Optionally, the digital signal processor is further configured to determine that the audio signal associated with the microphone array corresponds to a given direction based on the value of the first, second and third time delays; wherein the digital signal processor is configured to iteratively adjust the first, second and third time delays and determine a plurality of corresponding audio signals associated with the iteratively adjusted first, second and third time delays; and to compare the plurality of corresponding audio signals to determine the direction most closely corresponding to a desired sound signature or source.

Optionally, the digital signal processor is further configured to determine one or more respective audio signals associated with one or more corresponding further microphone arrays arranged on the plane, and to combine each audio signal associated with the microphone arrays to determine an audio signal associated with an array of the microphone arrays using a beamforming algorithm. Optionally, a delay and sum beamforming algorithm is chosen to be the beamforming algorithm.

Optionally, the plurality of microphone arrays are tessellated together such that at least one microphone is shared between two adjacent microphone arrays.

In a third aspect of the present disclosure, a system for directional processing of audio information for a microphone array is provided. The system comprises the apparatus of the second aspect of the present disclosure as well as a microphone array. The microphone array comprises at least two parallel pairs of microphones that are non-collinear with respect to each other, wherein a first pair of microphones comprises a first microphone and a second microphone and a second pair of microphones comprises third microphone and a fourth microphone, and wherein each microphone is arranged on a plane.

In a fourth aspect of the present disclosure, a method for directional processing of audio information in a digital signal processor for a loudspeaker array is provided. The method comprises receiving an audio signal to be transmitted by the loudspeaker array; and determining respective audio signals to apply to each loudspeaker of a loudspeaker array, wherein the loudspeaker array comprises at least two parallel pairs of loudspeakers that are non-collinear with respect to each other, wherein a first pair of loudspeakers comprises a first loudspeaker and a second loudspeaker and a second pair of loudspeakers comprises third loudspeaker and a fourth loudspeaker, and wherein each loudspeaker is arranged on a plane.

The respective audio signals to apply to each loudspeaker are determined by: determining the audio signal associated with the first pair of loudspeakers to be the audio signal to be transmitted by the loudspeaker array; applying a delay and invert algorithm, using a first time delay, to the audio signal to be transmitted by the loudspeaker array to determine an audio signal associated with the second pair of loudspeakers; determining the audio signal to be applied to the first loudspeaker to be the audio signal associated with the first pair of loudspeakers; applying a delay and invert algorithm, using a second time delay, to the audio signal associated with the first pair of loudspeakers to determine the audio signal to be applied to the second loudspeaker; determining the audio signal to be applied to the third loudspeaker to be the audio signal associated with the second pair of loudspeakers; and applying a delay and invert algorithm, using a third time delay, to the audio signal associated with the second pair of loudspeakers to determine the audio signal to be applied to the fourth loudspeaker. The first, second and third time delays are configured to control the directionality of the audio signal to be transmitted by the loudspeaker array.

In this manner, the method advantageously provides a loudspeaker array that is able to transmit a highly directional beam of sound with wideband suppression away from the direction of the sound beam while maintaining a relatively uniform frequency response for transmissions within the beam width of the loudspeaker array.

In a fifth aspect of the present disclosure, an apparatus for directional processing of audio information in a digital signal processor for a loudspeaker array is provided. The apparatus comprises an input configured to receive an audio signal to be transmitted by the loudspeaker array, wherein the loudspeaker array comprises at least two parallel pairs of loudspeakers that are non-collinear with respect to each other, wherein a first pair of loudspeakers comprises a first loudspeaker and a second loudspeaker and a second pair of loudspeakers comprises third loudspeaker and a fourth loudspeaker, and wherein each loudspeaker is arranged on a plane The apparatus further comprises a digital signal processor, configured to determine respective audio signals to apply to each loudspeaker of a loudspeaker array, by: determining the audio signal associated with the first pair of loudspeakers to be the audio signal to be transmitted by the loudspeaker array; applying a delay and invert algorithm, using a first time delay, to the audio signal to be transmitted by the loudspeaker array to determine an audio signal associated with the second pair of loudspeakers; determining the audio signal to be applied to the first loudspeaker to be the audio signal associated with the first pair of loudspeakers; applying a delay and invert algorithm, using a second time delay, to the audio signal associated with the first pair of loudspeakers to determine the audio signal to be applied to the second loudspeaker; determining the audio signal to be applied to the third loudspeaker to be the audio signal associated with the second pair of loudspeakers; and applying a delay and invert algorithm, using a third time delay, to the audio signal associated with the second pair of loudspeakers to determine the audio signal to be applied to the fourth loudspeaker. The first, second and third time delays are configured to control the directionality of the audio signal to be transmitted by the loudspeaker array.

Optionally, the first time delay is set based on the relative distance between the first and second loudspeakers, the second time delay is set based on the relative distance between the third and fourth loudspeakers, and third time delay is set based on the relative distance between the first pair of loudspeakers and the second pair of loudspeakers; wherein the distance between the loudspeakers in a pair of loudspeakers is uniform across the pairs of loudspeakers; wherein the first time delay and the second time delay are equal; and wherein the first, second, third and fourth loudspeakers are arranged at the vertices of a parallelogram.

Optionally, the digital signal processor is further configured to determine one or more respective audio signals associated with one or more corresponding further loudspeaker arrays arranged on the plane using a beamforming algorithm.

BRIEF DESCRIPTION OF THE DRAWINGS

Embodiments of the invention will now be described, by way of example only, and with reference to the accompanying drawings, in which.

DETAILED DESCRIPTION

The present disclosure is directed to a method and apparatus for directional processing of audio information in a digital signal processor for an audio transducer array and a corresponding system including the audio transducer array. In one embodiment, the audio transducers are microphones and the microphone array may be used to detect sounds originating from a given direction. However, the skilled person will appreciate that the same operating principles may be applied in reverse to an array of loudspeakers instead of microphones. In this further embodiment, the loudspeaker array may be used to produce a beam of sound that is highly directional.

Figure 6:
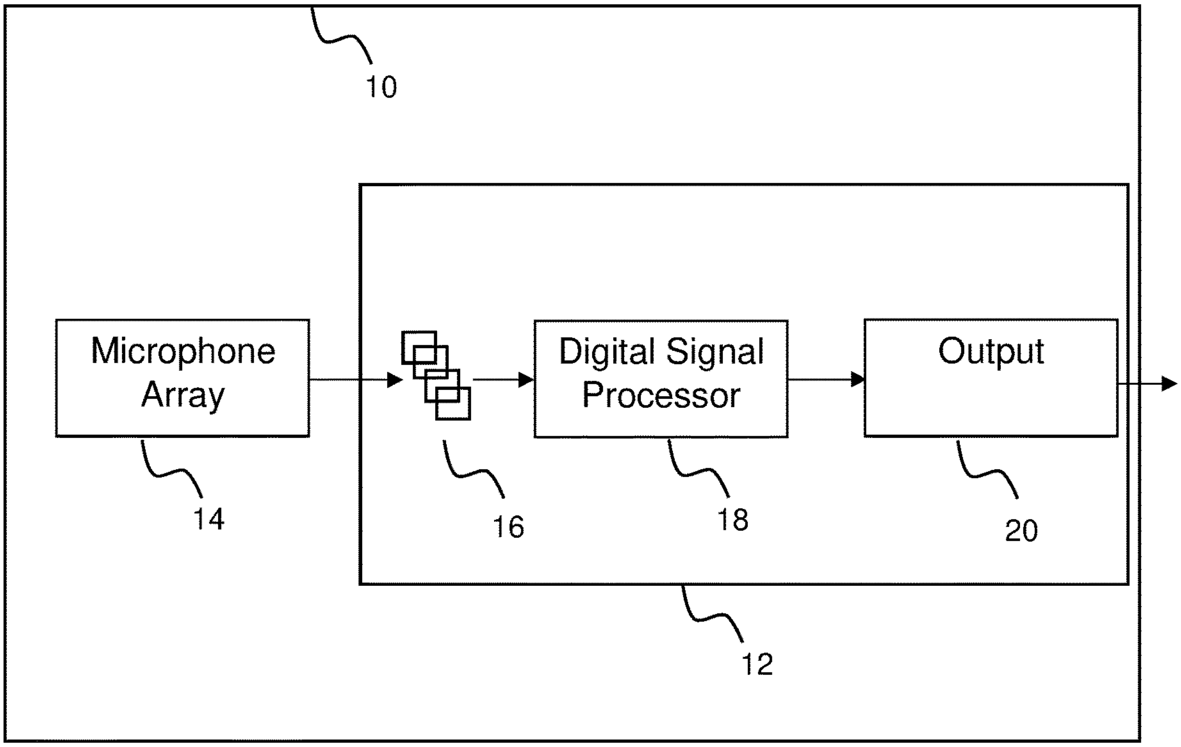
FIG. 6 is a block diagram of a system 10 according to a microphone embodiment of the present disclosure.

FIG. 6 is a block diagram showing a system 10 according to an embodiment of the present disclosure. The system 10 comprises an apparatus 12 and a microphone array 14. The apparatus 12 includes a plurality of inputs 16, for receiving the audio signals from each of the microphones in the microphone array, and a digital signal processor 18 in communication with each of the inputs 16. The digital signal processor is also in communication with an output module 20 for outputting the result of the digital signal processing.

It will be appreciated that the preamps and analogue to digital converters for the audio signals captured by the microphones of the microphone array may be placed at any point along the communication path between the microphones 14 and the digital signal processor 18. For example, the individual microphones may be connected to one or more inputs 16 of the apparatus 12 for analogue to digital conversion within the apparatus 14, or alternatively the analogue to digital conversion may take place prior to the apparatus 12 such that the audio signals for all of the microphones in the microphone array are received at the apparatus at a single input 16 in the digital domain.

Figure 7:
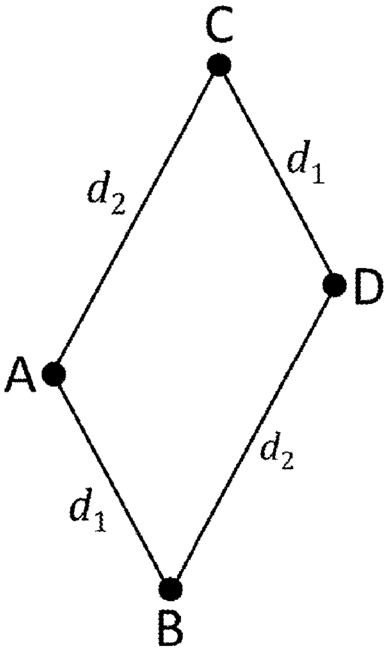
FIG. 7 is an illustration of the placement of four microphones in the shape of a parallelogram.

In one embodiment, the microphone array 14 may comprise four microphones positioned at the vertices of a parallelogram as shown in FIG. 7. In particular, the four microphones may be divided into a first pair of microphones A and B, and a second pair of microphones C and D. The distance between the microphones in each of the microphone pairs is $d_1$ and the distance between the respective pairs of microphones is $d_2$. The inventors have appreciated that a delay-and-subtract beamforming algorithm can be used with such a microphone array to provide an improved beamforming output.

While the first pair (AB) of microphones and the second pair (CD) of microphones are parallel to each other, they are not arranged in a line and so they will be referred to herein as a non-collinear pair of microphone pairs. For sound received from an audio source in a given direction, the double delay-and-subtract algorithm will follow the same analysis as set out in regard to equation 7 above. In particular, the audio signal detected by the microphone array 14 may be output as:

$$D_{double\text{-}diff}(t) = D(t) - C(t - T_1) - B(t - T_2) + A(t - T_1 - T_2) \tag{8}$$

Figure 8:
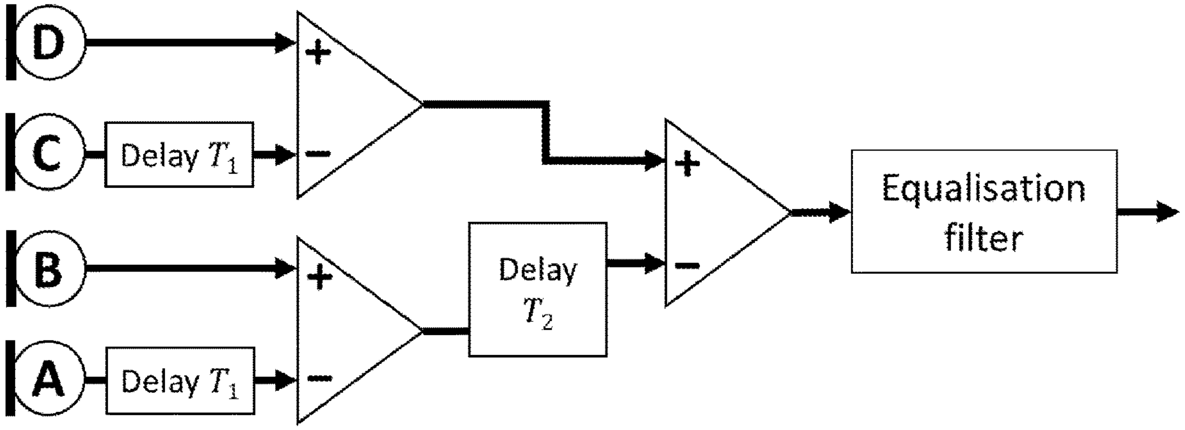
FIG. 8 is block diagram of a double delay-and-subtract array algorithm for four microphones.

The logic of equation 8 is also illustrated in FIG. 8, with the addition of the normalisation/frequency equalisation filter discussed above for correcting the frequency response of the microphone array 14 in order to approximate a flat frequency response.

This double delay-and-subtract algorithm once again produces two null cones, but because the two pairs are non-collinear these two null cones will be oriented in different directions. As can be seen from FIG. 8, the null cone corresponding to the two delay-and-subtract pairs will be oriented along the direction of the axis of those pairs and will have an angle $\theta_1$ based on the distance $d_1$ and the time delay $T_1$. When then progressing to the double delay-and-subtract step of the algorithm, the respective outputs of the AB first pair of microphones and of the CD second pair of microphones are treated mathematically as the output received at respective single fictional/virtual microphones. Accordingly, the axis running through these two virtual microphones will be along the direction between microphones B and D (or equally that of A and C) and so the additional null cone corresponding to the double delay-and-subtract combination will be oriented along this direction with an angle $\theta_2$ based on the distance $d_2$ and the time delay $T_2$.

In the plane of the microphone array, these two null cones will correspond to four null directions (two null pairs). By configuring the geometry of the microphone array appropriately, and adjusting the delays applied to the microphone signals, the angles of the null directions can be tuned/steered to adjust the position of the nulls to build a sequence of nulls that combine together to form a hole in the sensitivity of the microphone array 14 in order to reduce the sensitivity of the microphone array in directions other that the direction of interest. It has been found that narrow angle null cones are more effective than wide angle (for example in the region of 90°) null cones and accordingly the orientation of the null cones in different directions advantageously enables narrow null cones to be targeted at adjacent angles to provide improved audio signal rejection in that region.

When designing such an array, the distance $d_1$ between the microphones in each pair should be set to be smaller than half the shortest wavelength of interest (ideally less than one-quarter wavelength). However, minimising this distance will lead to an increase in the low-frequency noise present in the system outputs and so a compromise between the two may be necessary when designing the array. The same logic applies to the selection of the distance $d_2$ for the array. In a particular use case, the processing of the system may be further simplified by selecting $d_1$ to be equal to $d_2$.

While the granularity of the adjustment of the half angle $\theta_1$ using the value of $T_1$ (see equation 2) is in theory infinite, the method and system will be most computationally efficient if the value of the $T_1$ time duration is set to be equal to an integer number of samples when considering the sample rate of the recording of the audio signal received at the microphones. This is because if the delay $T_1$ was not equal to an integer number of samples then the delayed value of the audio signal at the microphone being delayed would need to be interpolated by the digital signal processor from the values between the two adjacent samples. Accurate interpolated audio signals can be determined using scaled sinc functions based on the Nyquist-Shannon sampling theorem using known methods; however, the need for this additional processing can be avoided if the selected value of $T_1$ is optimised to be an integer number of samples.

This approach is conceptually different to the prior art, which instead focuses on providing an electronically steerable main beam, where the main beam is the range of directions from which the response of the array is at maximum gain, having a uniform response pattern relative to the steered direction of the microphone array.

Figure 1:
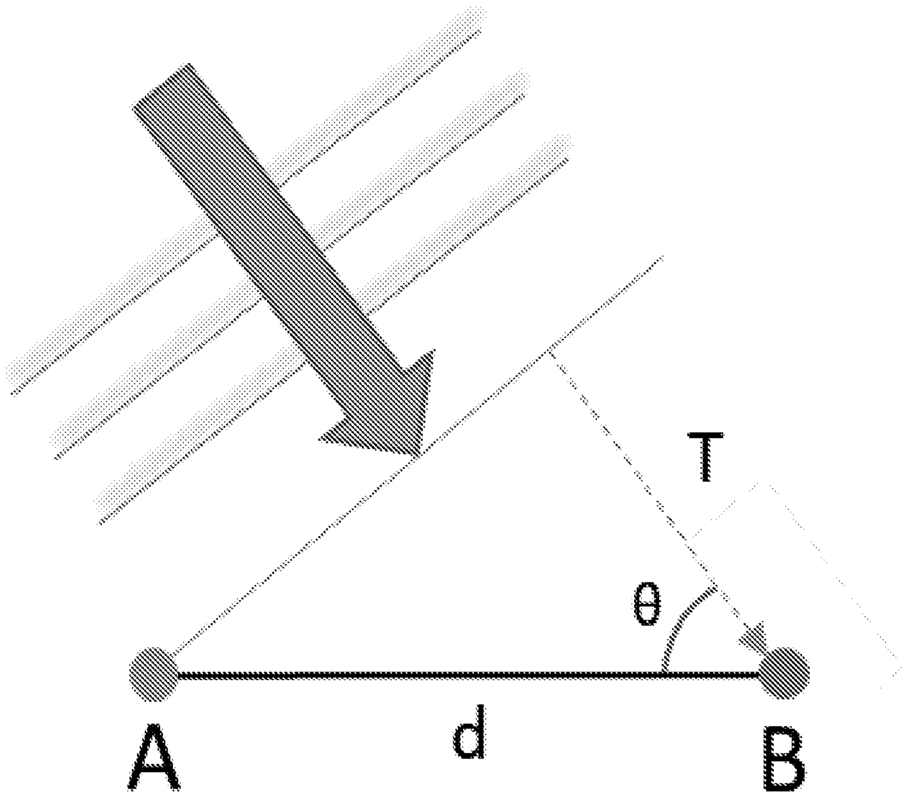
FIG. 1 is an illustration of a sound wave approaching a pair of microphones at an angle to the axis of the microphone pair.
Figure 2:
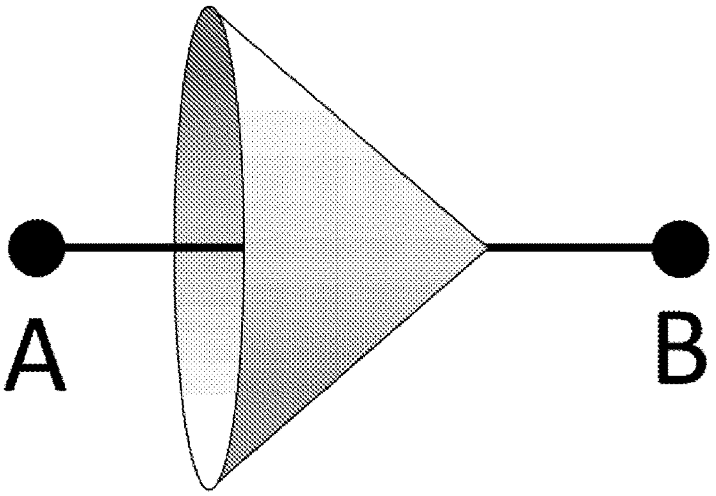
FIG. 2 is an illustration of a microphone pair showing a cone of nulls in three dimensions.
Figure 3:
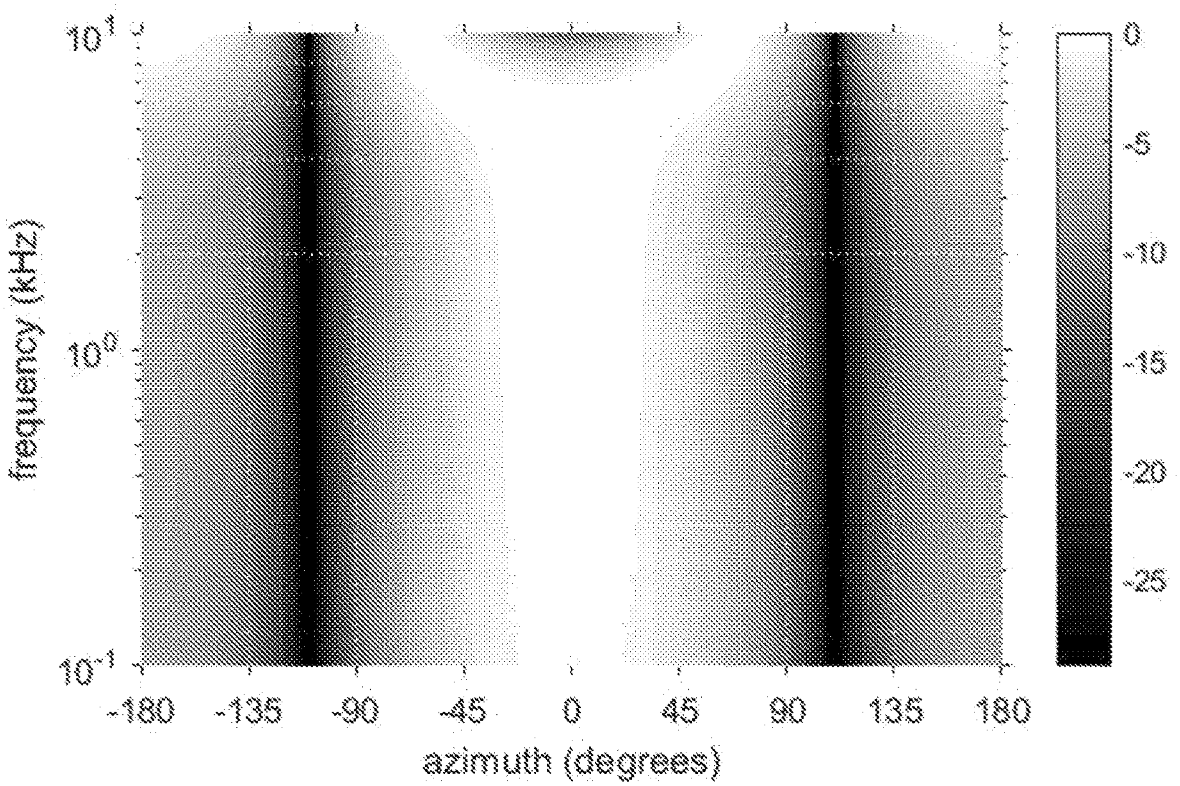
FIG. 3 is an example normalised directional frequency response for the output of a delay-and-subtract algorithm applied to a pair of microphones.
Figure 4:
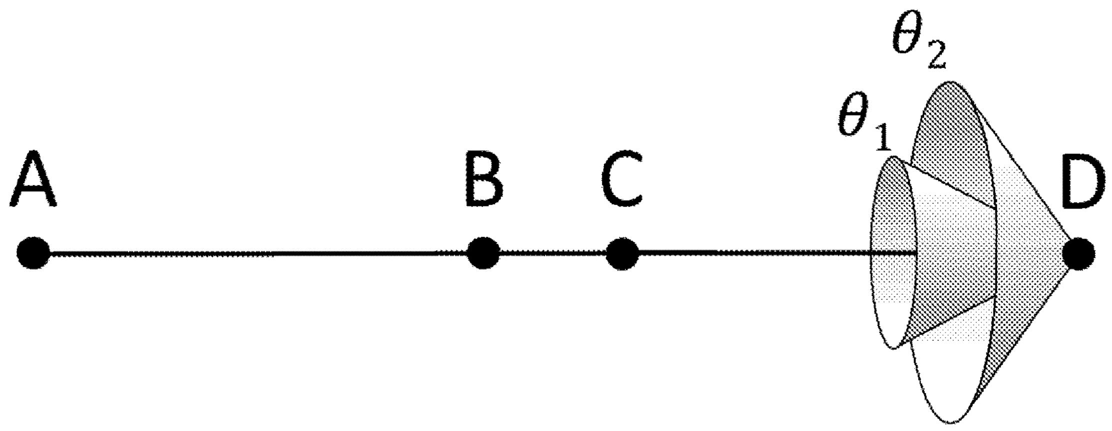
FIG. 4 is an illustration of two collinear microphone pairs showing in three dimensions two cones of nulls resulting from a double delay-and-subtract algorithm.
Figure 5:
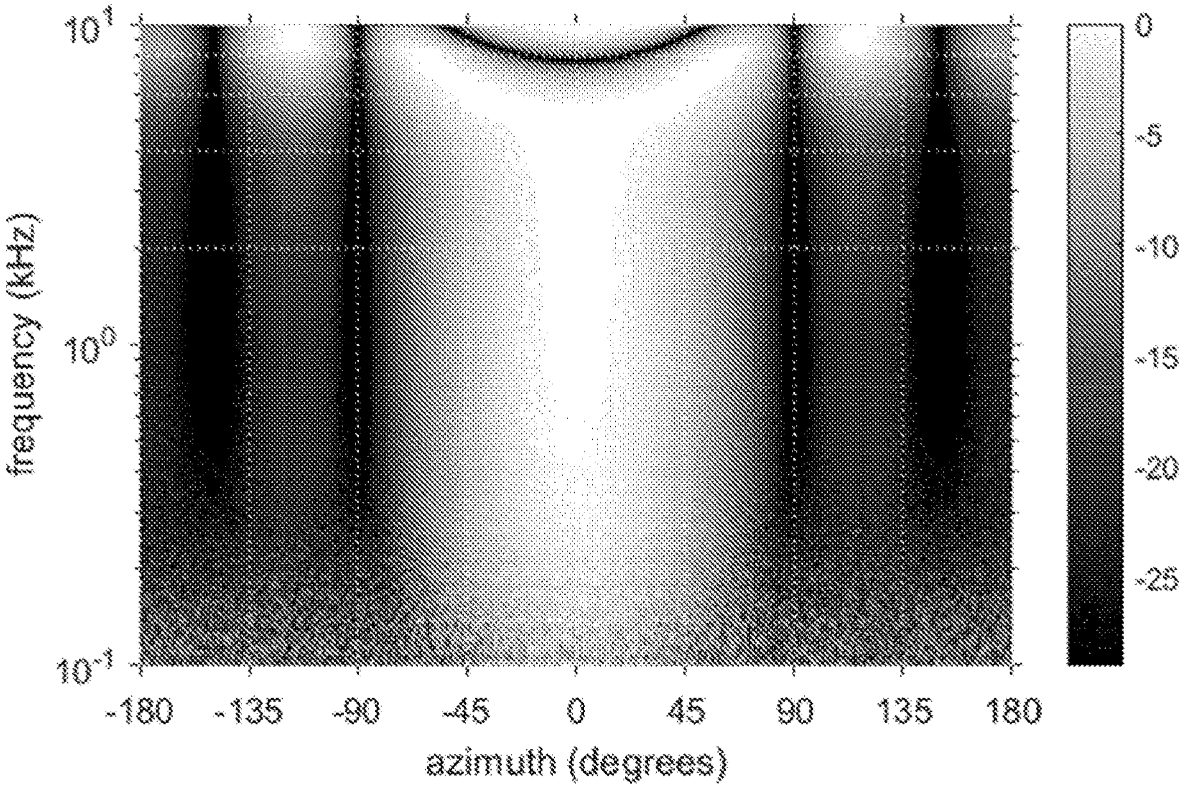
FIG. 5 is an example normalised directional frequency response for the output of a double delay-and-subtract algorithm applied to two collinear pairs of microphones.
Figure 10:
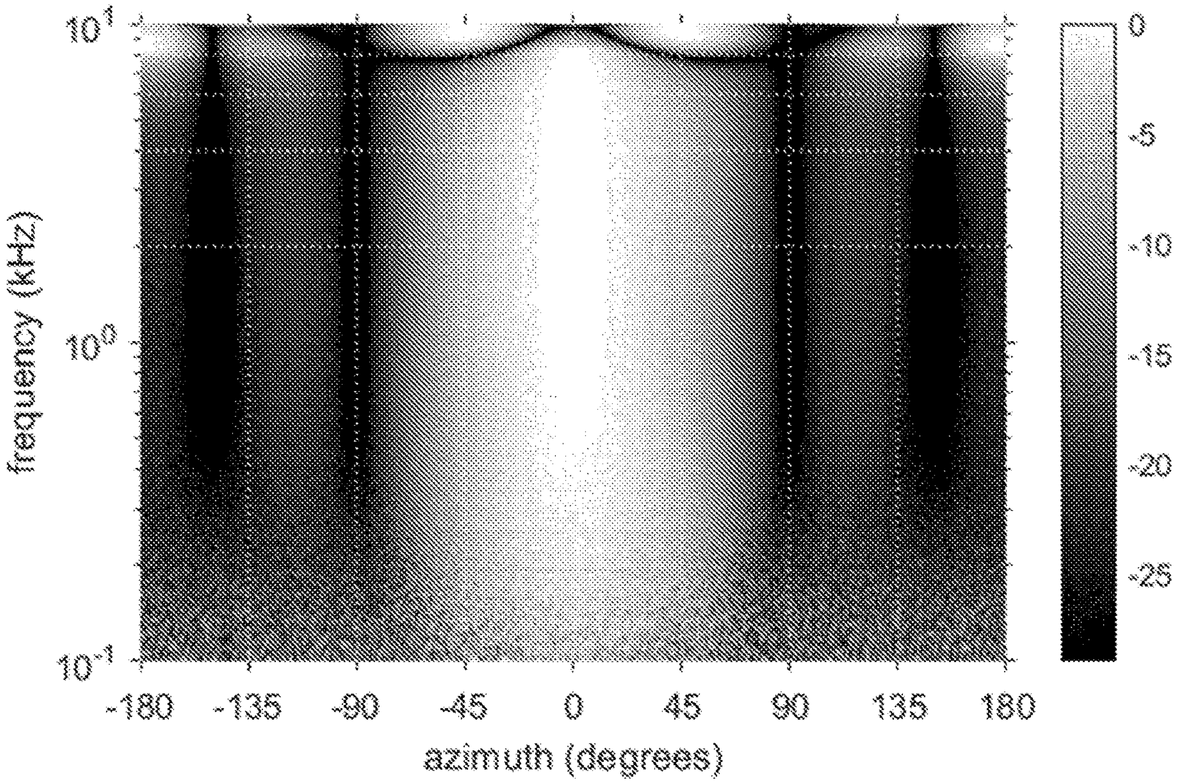
FIG. 10 is an example normalised directional frequency response for the output of a double delay-and-subtract algorithm applied to two non-collinear pairs of microphones.

By providing the microphones of the array in this non-collinear arrangement, the nulls having crossed orientations are able to provide wider interference suppression away from the main beam in the plane of the array. For example, FIG. 10 illustrates a plot of the directional frequency response of the non-collinear arrangement, which can be directly contrasted with that of FIG. 5. This improvement is obtained because the use of an in-plane beamforming direction provides more flexibility in the placement of nulls such that angle ranges away from the main beam can still be targeted with narrow null cones in the non-collinear arrangement, and the narrower null cones typically provide a broader range of suppression around the target null angle.

In summary, the proposed non-collinear arrangement of parallel pairs of microphones provides an improvement over the various known systems because:

- the use of the double delay-and-subtract beamforming for a two-dimensional array is easy to implement and is computationally efficient such that it can also be implemented in low power and/or mobile systems;
- the delay-and-subtract method is intrinsically wideband (works at all frequencies below an upper limit dependent on the microphone separation) and so there is no need to break the audio signal down into various different frequency bands for independent computation using corresponding weighting, which would be computationally expensive (this is particularly advantageous for applications involving broadband signals such as speech);
- the directionality of the system in isolating higher frequency sounds in the plane of the microphone array is improved while still maintaining good low frequency performance;
- the low frequency performance can be achieved with an increased separation between the microphones in comparison to the prior art, which in turn reduces the noise of the system (improves the white-noise gain) at low frequencies in comparison to conventional differential systems that have the same low-frequency pattern but have more closely-spaced microphones; and
- the larger separation between microphones improves the flexibility of the system for designing arrangements using time delays that are integer multiples of the audio sample length in order to reduce the complexity of the corresponding digital signal processing.

The system and method described above can be applied to an array of microphones that are each omnidirectional (i.e. the sensitivity of the microphone is the same for audio signals coming from all directions) and have a flat frequency response (i.e. the sensitivity of the microphone is the same for all frequencies). However, this is not essential and microphones having polar response patterns that are not omnidirectional may also be used. If respective microphones in a pair of microphones do not have the same polar response pattern, then it may be necessary to account for these differences by introducing a weighting to the audio signal associated with one of the microphones during the subtraction calculation. Where the microphones have a common directional polar response pattern, this can improve the directionality of the resulting microphone array and also simplify the processing of the respective audio signals as this additional weighting would not be necessary.

During the design phase, the response of the array can be considered to be the superimposition of an omnidirectional array response over the actual response of each single directional microphone in the array. This can be calculated by representing the directional microphone response and the omnidirectional response using complex numbers (indicating both an amplitude gain and a phase shift), and multiplying them together. This simple calculation enables the final system to be designed by considering the performance of the respective predicted responses separately, or multiplied together. The microphones in such an array would preferably have the same polar response pattern as each other and be orientated in the same direction.

Figure 9:
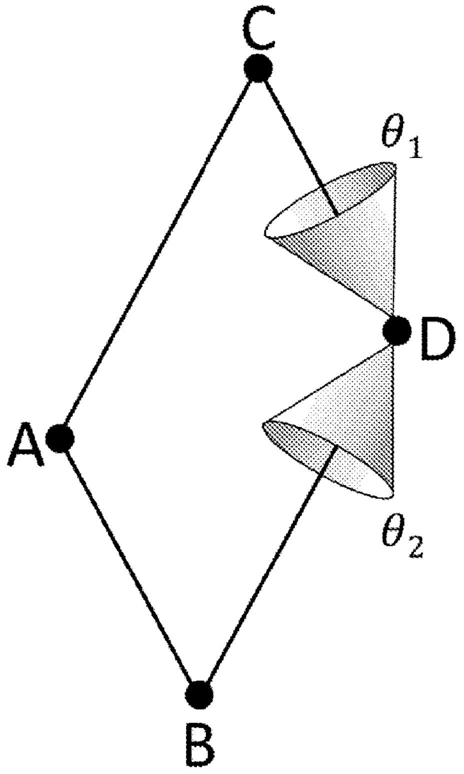
FIG. 9 is an illustration of the two cones of nulls resulting from a double delay-and-subtract algorithm applied to the arrangement of microphones shown in FIG. 7.

The use case described above provides two parallel pairs of microphones that are arranged at the vertices of a parallelogram (as shown in FIGS. 7 and 9), such as a rhombus, a rectangle, or a square. However, configurations with alternative shapes may also be used. For example, the distance between the respective pairs of microphones may not be equal, which would turn the parallelogram into a more general trapezium shape. Because the distance between the microphones in one pair would then be different to the distance between the other pair that is parallel, a different time delay will be required for each of the pairs of microphones. Similarly, the gain of the audio signal of the output of one of the pairs may need weighting in order match the gain levels of the two pairs.

Moreover, the same process can be extended to a larger array using additional microphones. For example, the process may be extended to a triple delay-and-subtract algorithm applied to four pairs of microphones whereby each of the four pairs undergo delay-and-subtract processing with the four resulting virtual microphones being used as the input for the previously described double delay-and-subtract algorithm. This would result in three null cones and therefore six null directions in the plane of the microphone array. While this extension improves the directionality of the beamforming, the use of additional microphones in this manner does also undesirably introduce additional self-induced microphone noise.

Alternatively, the system can be expanded by treating the array described above as a sub-array of a plurality of corresponding sub-arrays that together form a macro-array. Each sub-array may be considered to be a new virtual microphone having a directional response that can be combined together using superimposition. Specifically, for identical sub-arrays, the response of one sub-array can be calculated as set out above, then a response associated with the array arrangement of the virtual microphones (each corresponding to the location of one of the sub-arrays) can be calculated by considering each virtual microphone to be an omnidirectional microphone. Finally, the response of the macro-array can be considered to be the complex multiplication of the two responses computed in the previous step.

Because each null in a sub-array is corresponds to a zero response/sensitivity for a given angle of incoming sound signal, multiplying the responses together in this manner preserves these nulls such that the nulls of the macro-array comprises the nulls of each sub-array as well as any nulls associated with the array arrangement of virtual microphones. This is a powerful array design technique because the two responses to be superimposed can be designed and targeted independently and it is also much simpler to design an array to have the desired set of characteristics.

Optionally, it can be advantageous to determine the response of the array arrangement of virtual microphones using a delay-and-sum algorithm while still using the double delay-and-subtract algorithm for determining the response of the constituent sub-arrays. In this manner, the consistent beam width at low frequencies of the delay-and-subtract technique can be superimposed with the narrow beam width at high frequencies of the delay-and-sum technique to provide a narrower main beam that is steerable in the plane of the macro-array. When combining the sub-arrays in this manner, the normalisation using a frequency equalisation filter may be operated once on the determined response of the macro-array, rather than individually applying the filter to each sub-array prior to combining.

Figure 11:
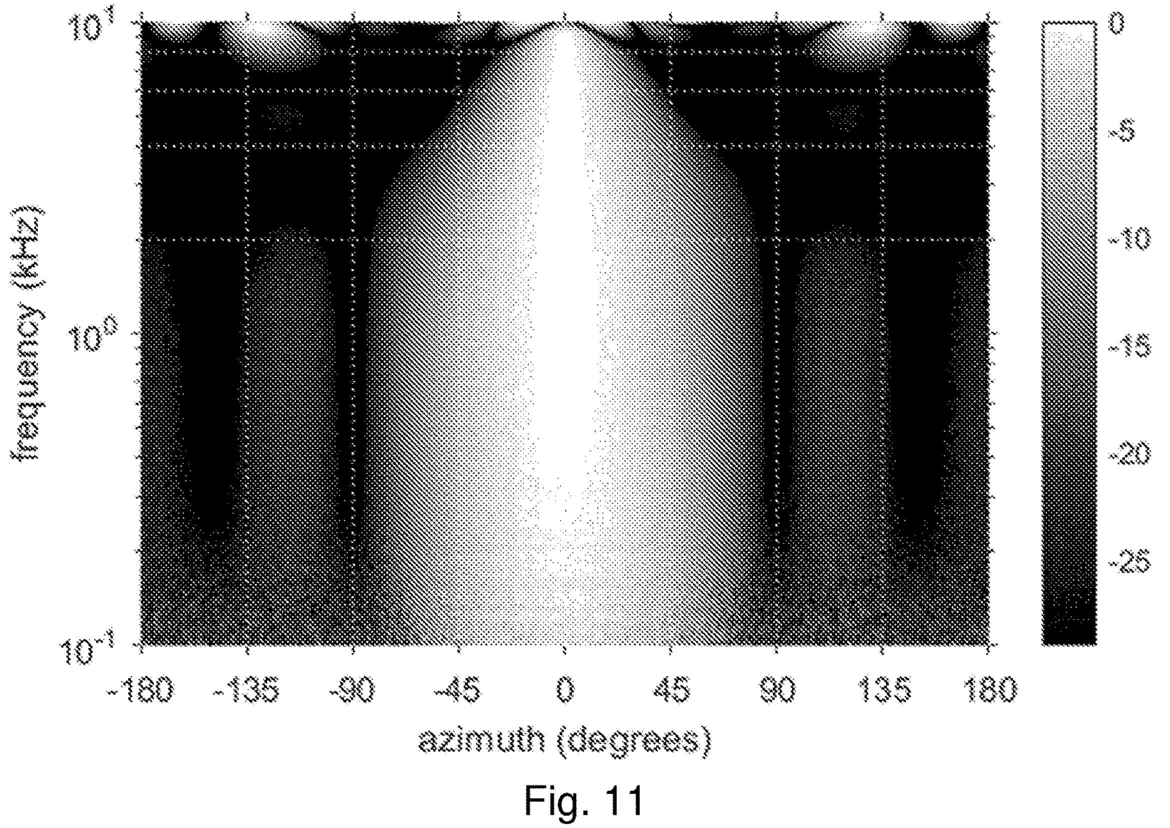
FIG. 11 is an example normalised directional frequency response for the output of a delay-and-sum algorithm applied to a plurality of sub-arrays each using double delay-and-subtract algorithms.

The impact of this further improvement is illustrated in FIG. 11, where it can be seen that the combination of sub-arrays in this manner additionally enables the side lobes of respective sub-arrays (or virtual microphones corresponding to the sub-arrays) to be hidden in the nulls (or otherwise low response regions) of the macro-array, or vice versa. The combination also means that a single sub-array is not required to prioritise a response having a particularly narrow main beam (and can instead focus on providing more consistent signal rejection away from the main beam by bunching nulls together more closely to reduce or eliminate side lobes etc.) because the combining of the sub-arrays will further narrow the main beam of the macro-array. The rejection away from the main beam can then be provided by directing a near continuous spread of nulls that combine to provide a high level of sound rejection for a wide range of angles of approach, which may be referred to as a wall of nulls.

Additionally, the delay-sum-aggregation of sub-arrays with comparatively wide main beam widths enables the delay values used in the delay-and-sum algorithm to adaptively tune the steering of the narrower macro-array main beam within the wider main beam of the sub-arrays.

Furthermore, contrary to increasing the number of microphones in a sub-array, increasing the number of sub-arrays in the macro-array actually reduces the white noise gain and the overall noise level of the system.

By using sub-arrays having four microphones arranged in a parallelogram, the formation of the macro-array can use tessellation to conjoin adjacent sub-arrays—this provides the further advantage that the position of a microphone in one sub-array can be made to overlap the position of a microphone in the adjoining sub-array such that the output of the single microphone can be used as in input to the beamforming algorithm of both sub-arrays. Indeed, in a tessellation of parallelograms each microphone can be arranged to contribute to the inputs of up to four sub-arrays. This obviously provides a significant reduction in the total number of physical microphones required to implement the macro-array. As an example, a tessellation of 25 sub-arrays using the parallelogram shape, which would otherwise require 100 physical microphones, can then be implemented with only 36 physical microphones.

Tessellation in this manner is enabled by the use of sub-arrays that are larger than those seen in the prior art based on the wavelength limitation considerations of the prior art. It will be appreciated that sub-array shapes other than parallelograms may also be tessellated in a similar manner and the present disclosure is not limited in this regard.

As set out above, the present disclosure provides a system and method for distinguishing a single speaker or sound source from surrounding noise for use in a wide range of applications, such as in personal hearing aids or for detecting the position of an object known to be associated with a particular sound signature, such as an animal, a vehicle, a drone or other aircraft, or to detecting the direction of signs of life in an emergency rescue situation. In order to determine the direction associated with the source of the sound signature, the various time delays associated with the beamforming of the macro-array may be adjusted iteratively to sweep the main beam of the macro-array in order to locate the direction from which the strongest audio signal is detected.

However, the present invention is not limited to this aspect and these same principles for processing the output of an array of microphones can also be used for processing the input to an array of loudspeakers in order to provide a highly directional sound output. The skilled person will appreciate that the operation of a loudspeaker is simply the reverse of a microphone and that above teaching can simply be reversed to apply it to the embodiment of a loudspeaker array.

Figure 12:
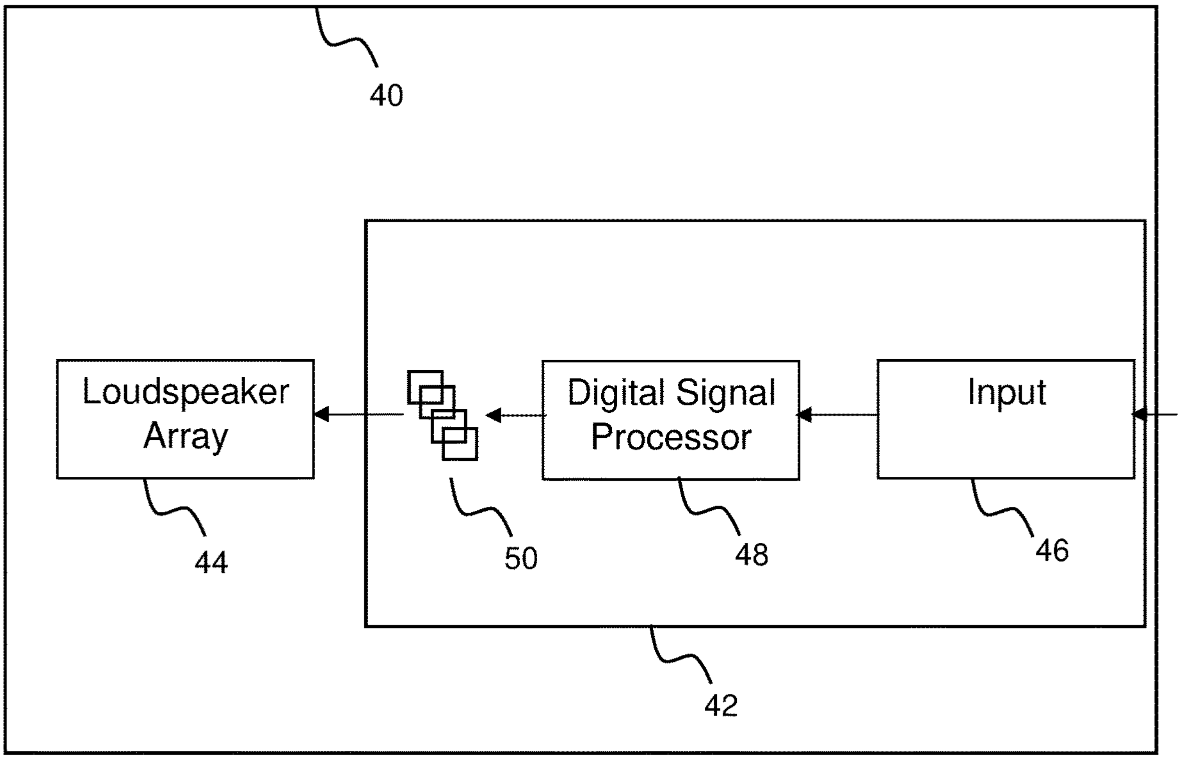
FIG. 12 is a block diagram of a system 40 according to a loudspeaker embodiment of the present disclosure.

An example system 40 for this aspect of the disclosure providing directional processing of audio information is shown in FIG. 12. The system 40 comprises an apparatus 42 and a loudspeaker array 44. The apparatus 42 comprises an input 46, a digital signal processor 48 and one or more outputs 50. It will be appreciated that the power amplification required to drive the loudspeakers may be placed at any point along the communication path between the loudspeakers 44 and the digital signal processor 48. For example, the power amplifiers may form part of the apparatus 42, or alternatively may be located close to the loudspeaker array 44.

In one embodiment the loudspeaker array may comprise at least two parallel pairs of loudspeakers that are non-collinear with respect to each other, wherein a first pair of loudspeakers comprises a first loudspeaker and a second loudspeaker and a second pair of loudspeakers comprises third loudspeaker and a fourth loudspeaker, with each of these loudspeakers being arranged on a plane. By configuring these loudspeakers to have a common directivity/dispersion pattern, the associated processing required for determining the audio signals to be applied to the respective loudspeakers can be simplified, however differences in the directivity/dispersion patterns of a pair of loudspeakers can instead be accounted for by introducing a weighting to the audio signal associated with one of the loudspeakers in each stage involving inversion.

The input 46 of the apparatus 40 may be configured to receive an audio signal to be transmitted by the loudspeaker array and to communicate this to the digital signal processor 48 for processing. The digital signal processor 48 may be configured to determine respective audio signals to apply to each loudspeaker of a loudspeaker array 44, by: determining the audio signal associated with the first pair of loudspeakers to be the audio signal to be transmitted by the loudspeaker array, and applying a delay and invert algorithm, using a first time delay, to the audio signal to be transmitted by the loudspeaker array to determine an audio signal associated with the second pair of loudspeakers.

The delay and invert algorithm applies a delay to the audio signal and then inverts it by multiplying it by minus one. This corresponds to the delay-and-subtract algorithm for the microphone embodiment, but the concepts of addition and subtraction do not follow in the loudspeaker embodiment because it is dividing up the audio signal rather than combining respective audio signals. Accordingly, inversion in the loudspeaker embodiment corresponds to subtraction in the microphone embodiment.

The audio signal to be applied to the first loudspeaker can then be determined to be the audio signal associated with the first pair of loudspeakers, and a delay and invert algorithm can be applied, using a second time delay, to the audio signal associated with the first pair of loudspeakers to determine the audio signal to be applied to the second loudspeaker. Similarly, the audio signal to be applied to the third loudspeaker can be determined to be the audio signal associated with the second pair of loudspeakers, and a delay and invert algorithm can be applied, using a third time delay, to the audio signal associated with the second pair of loudspeakers to determine the audio signal to be applied to the fourth loudspeaker. By controlling the first, second and third time delays, the apparatus 40 can control the directionality of the audio signal to be transmitted by the loudspeaker array 44.

As with the microphone arrangement, one embodiment of this aspect of the disclosure can provide a loudspeaker array with four loudspeakers arranged at the vertices of a parallelogram, for which the first and second time delays will be set to be equal since the distance between the first pair of loudspeakers and the distance between the second pair of loudspeakers will be the same. Again this loudspeaker array can be treated as a sub-array of a larger macro-array of loudspeakers formed by tessellating corresponding sub-arrays of loudspeakers using the teaching laid out above in respect of microphone arrays.

The invention claimed is:

1. A method for directional processing of audio information in a digital signal processor for a microphone array, the method comprising:

receiving an audio signal from each microphone of a microphone array, wherein the microphone array comprises at least two parallel pairs of microphones that are non-collinear with respect to each other, wherein a first pair of microphones comprises a first microphone and a second microphone and a second pair of microphones comprises a third microphone and a fourth microphone, and wherein each microphone is arranged on a plane;

applying a first time delay to the audio signal from the second microphone, and subtracting the delayed audio signal of the second microphone from the audio signal from the first microphone to determine an audio signal associated with the first pair of microphones;

applying a second time delay to the audio signal from the fourth microphone, and subtracting the delayed audio signal of the fourth microphone from the audio signal from the third microphone to determine an audio signal associated with the second pair of microphones; and applying a third time delay to the audio signal associated with the second pair of microphones, and subtracting the delayed audio signal associated with the second pair of microphones from the audio signal associated with the first pair of microphones to determine an audio signal associated with the microphone array;

wherein the first, second and third time delays are configured to control the directionality of the audio signal associated with the microphone array.

2. The method of claim 1, wherein the first time delay is set based on a relative distance between the first and second microphones, the second time delay is set based on a relative distance between the third and fourth microphones, and third time delay is set based on a relative distance between the first pair of microphones and the second pair of microphones.

3. The method of claim 1, wherein a distance between the microphones in a pair of microphones is uniform across the pairs of microphones, and wherein the first time delay and the second time delay are equal.

4. The method of claim 1, wherein the microphone array comprises two pairs of microphones and the first, second, third and fourth microphones are arranged at vertices of a parallelogram.

5. The method of claim 1, wherein the determined audio signal associated with the microphone array corresponds to a given direction based on a value of the first, second and third time delays; the method further comprising:

iteratively adjusting the first, second and third time delays and determining a plurality of corresponding audio signals associated with the iteratively adjusted first, second and third time delays; and comparing the plurality of corresponding audio signals to determine the direction most closely corresponding to a desired sound signature or source.

6. The method of claim 1, further comprising determining one or more respective audio signals associated with one or more corresponding further microphone arrays arranged on the plane, and combining each audio signal associated with the microphone arrays to determine an audio signal associated with an array of the microphone arrays using a beamforming algorithm.

7. The method of claim 6, wherein the beamforming algorithm is a delay and sum beamforming algorithm.

8. An apparatus for directional processing of audio information for a microphone array, the apparatus comprising:

one or more inputs, configured to receive an audio signal from each microphone of a microphone array, wherein the microphone array comprises at least two parallel pairs of microphones that are non-collinear with respect to each other, wherein a first pair of microphones comprises a first microphone and a second microphone and a second pair of microphones comprises third microphone and a fourth microphone, and wherein each microphone is arranged on a plane; and a digital signal processor, configured to apply a first time delay to the audio signal from the second microphone, and to subtract the delayed audio signal of the second microphone from the audio signal from the first microphone to determine an audio signal associated with the first pair of microphones; and configured to apply a second time delay to the audio signal from the fourth microphone, and to subtract the delayed audio signal of the fourth microphone from the audio signal from the third microphone to determine an audio signal associated with the second pair of microphones; and configured to apply a third time delay to the audio signal associated with the second pair of microphones, and to subtract the delayed audio signal associated with the second pair of microphones from the audio signal associated with the first pair of microphones to determine an audio signal associated with the microphone array;

wherein the first, second and third time delays are configured to control the directionality of the audio signal associated with the microphone array.

9. The apparatus of claim 8, wherein the first time delay is set based on a relative distance between the first and second microphones, the second time delay is set based on a relative distance between the third and fourth microphones, and third time delay is set based on a relative distance between the first pair of microphones and the second pair of microphones.

10. The apparatus of claim 8, wherein a distance between the microphones in a pair of microphones is uniform across the pairs of microphones, and wherein the first time delay and the second time delay are equal.

11. The apparatus of claim 8, wherein the microphone array comprises two pairs of microphones and the first, second, third and fourth microphones are arranged at vertices of a parallelogram.

12. The apparatus of claim 8, wherein the digital signal processor is further configured to determine that the audio signal associated with the microphone array corresponds to a given direction based on a value of the first, second and third time delays; wherein the digital signal processor is configured to iteratively adjust the first, second and third time delays and determine a plurality of corresponding audio signals associated with the iteratively adjusted first, second and third time delays; and to compare the plurality of corresponding audio signals to determine the direction most closely corresponding to a desired sound signature or source.

13. The apparatus of claim 8, wherein the digital signal processor is further configured to determine one or more respective audio signals associated with one or more corresponding further microphone arrays arranged on the plane, and to combine each audio signal associated with the microphone arrays to determine an audio signal associated with an array of the microphone arrays using a beamforming algorithm.

14. The apparatus of claim 13, wherein the beamforming algorithm is a delay and sum beamforming algorithm.

15. The apparatus of claim 13, wherein a plurality of microphone arrays are tessellated together such that at least one microphone is shared between two adjacent microphone arrays.

16. A system for directional processing of audio information for a microphone array, the system comprising:

a microphone array comprising at least two parallel pairs of microphones that are non-collinear with respect to each other, wherein a first pair of microphones comprises a first microphone and a second microphone and a second pair of microphones comprises third microphone and a fourth microphone, and wherein each microphone is arranged on a plane; and the apparatus of claim 8.

* * * * *